C. W. FELKER.
LAWN MOWER.
APPLICATION FILED SEPT. 7, 1911.
1,018,487.
Patented Feb. 27, 1912.
2 SHEETS—SHEET 1.
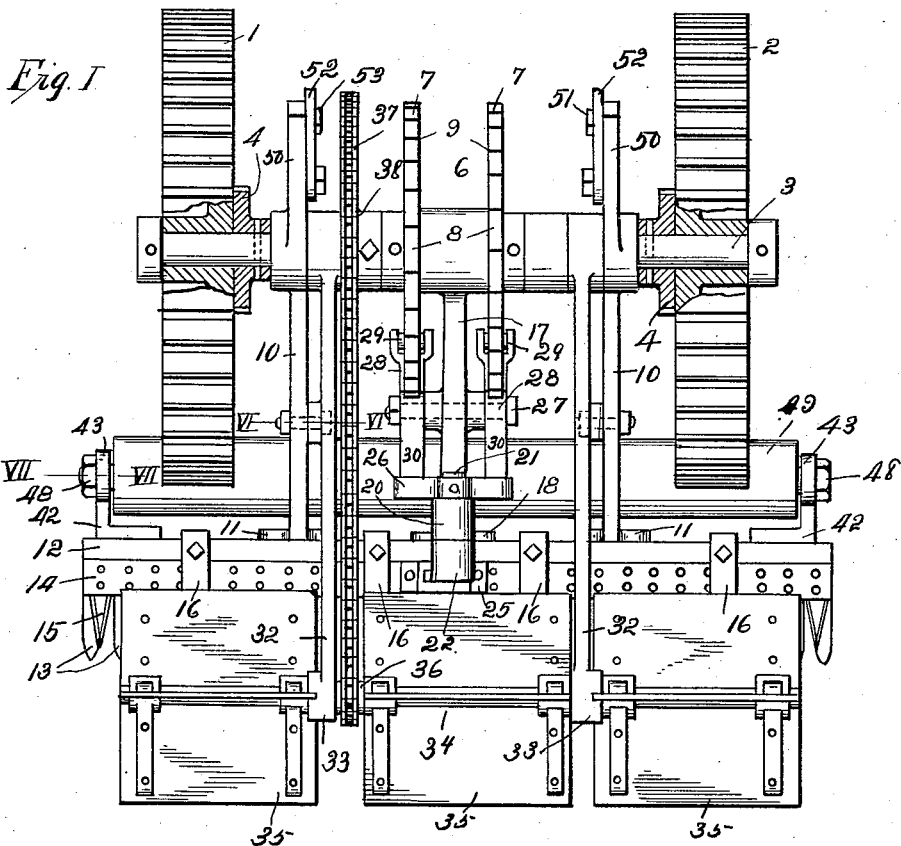
WITNESSES:
R. E. Hamilton
J. C. Irwin
Charles W. Felker INVENTOR.
BY
Warren D. House
ATTORNEY.

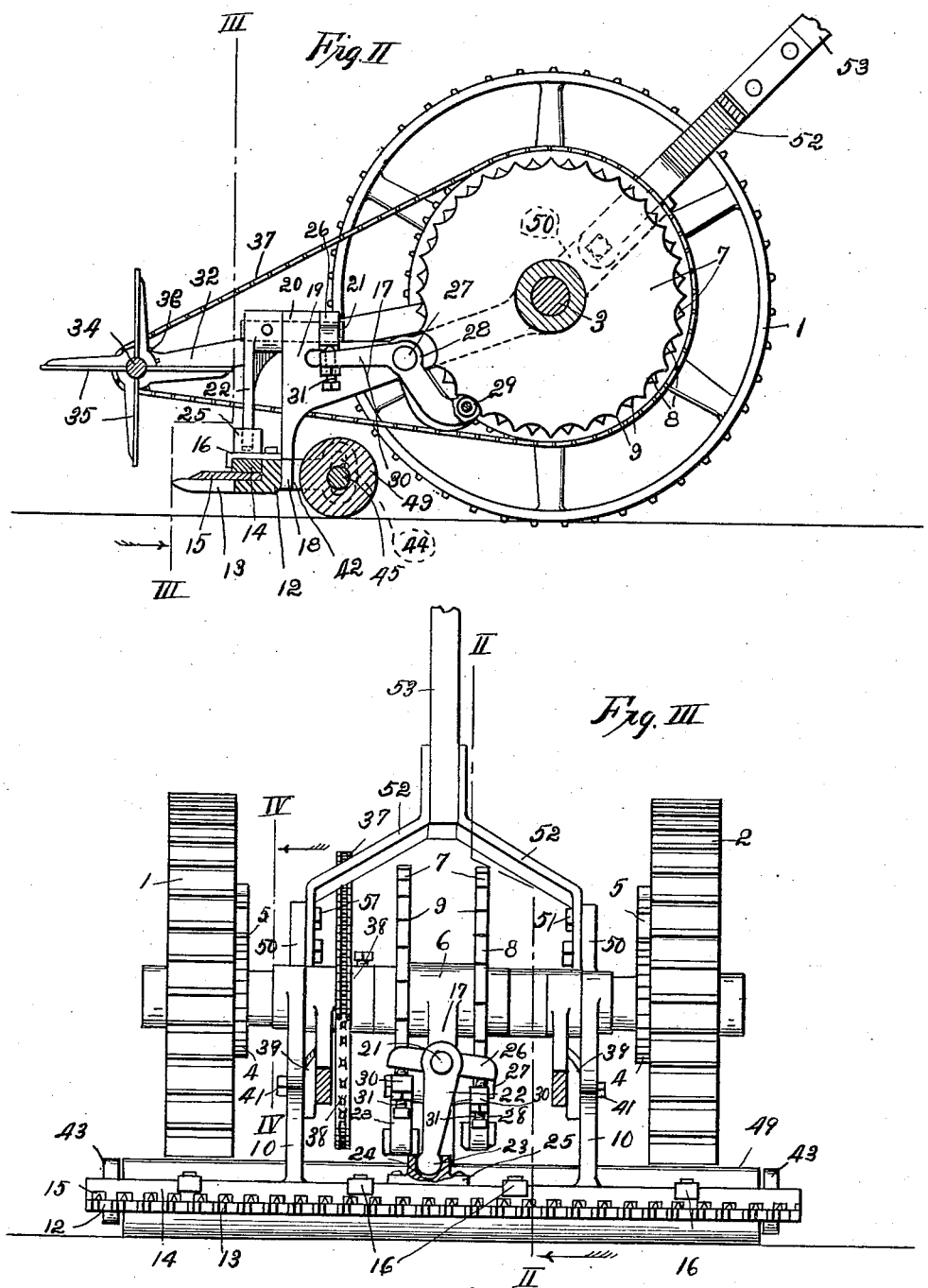

UNITED STATES PATENT OFFICE.

CHARLES W. FELKER, OF KANSAS CITY, KANSAS, ASSIGNOR OF ONE-HALF TO ARTHUR FELKER, OF CLARENCE, MISSOURI.

LAWN-MOWER.

1,018,487.

Specification of Letters Patent. Patented Feb. 27, 1912.

Application filed September 7, 1911. Serial No. 648,169.

*To all whom it may concern:*

Be it known that I, CHARLES W. FELKER, a citizen of the United States, residing at Kansas City, in the county of Wyandotte and State of Kansas, have invented certain new and useful Improvements in Lawn-Mowers, of which the following is a specification.

My invention relates to lawn-mowers and more particularly to a machine of a type comprising a reciprocatory sickle located in advance of the running gear; the principal object of the present invention being to provide improved mechanism for actuating the sickle from the running gear shaft.

It is a further object of the invention to provide a fan for moving uncut grass into the sickle and for blowing mown grass away from the sickle and operating mechanism.

Other objects of the invention are disclosed in the following description and are illustrated in the accompanying drawings, wherein:—

Figure I is a plan view of a lawn-mower constructed according to my invention. Fig. II is a cross section of same on the line II—II, Fig. III. Fig. III is a front view of the machine, the fan supporting and operating parts being in section on the line III—III, Fig. II. Fig. IV is a side view of one of the ground wheels, the shaft being in section on the line IV—IV, Fig. III. Fig. V is a detail view of a part of one of the fan supporting bars, showing its mounting on the sickle carrying bar. Fig. VI is a sectional view of same on the line VI—VI, Fig. I. Fig. VII is a sectional view of the roller mounting on the line VII—VII, Fig. I.

Referring more in detail to the parts:—1 and 2 designate ground wheels of ordinary construction, within which a shaft 3 is revolubly mounted, said shaft being provided with fixed ratchets 4 and the wheel sprockets carrying spring pressed pawls 5 whereby a driving connection is formed between the wheels and shaft when the machine is moved forwardly, and which enable the machine to be moved rearwardly with the wheels revolving idly relative to the shaft.

Fixed to the shaft 3, near the center, and spaced by a collar 6 are disks 7, the periphery of each of which is serrated to provide the curved socket paths 8 and points 9, for a purpose presently set forth. Also fixed to shaft 3, adjacent to the ground wheels, are bars 10 which extend forwardly in advance of the wheels and have depending ends 11. Mounted on the depending ends of the bars is a knife frame 12 having forwardly projecting guards 13, and slidably mounted in said frame is a sickle bar 14 having knife sections 15 adapted to travel within the guards for the usual purpose, said bar 14 being guided on the frame by straps 16.

On the collar 6, which spaces the serrated disks, 7, is an arm 17 having a depending outer end 18 attached to the knife frame and having an upwardly projecting post 19 provided with a hub 20. Revolubly mounted in hub 20 is a shaft 21, the forward end of which carries a fixed rocker bar 22 having a circular knob 23 at its lower end projected into a rounded socket 24 in a fitting 25 which is rigidly fixed to the sickle bar 14. Fixed to the inner end of shaft 21 is a rocking bracket 26, the ends of which project laterally beyond the extended planes of the serrated disks 7.

Carried by and projecting laterally from both sides of the arm 17 in advance of the serrated disks is a pin 27, and pivotally mounted on each end of the pin is a crank 28, one arm of which projects rearwardly and carries an anti-friction roller 29 in position for engaging the serrated periphery of one of the disks. Each of said cranks is also provided with a forwardly projecting arm 30 which extends below the rocking bracket 26 and has an adjacent pin 31 for engaging the under face of said bracket, in order to hold the crank in such position, relative to the disks, that the anti-friction rollers will have constant contact with the disk peripheries without binding the parts to prevent free movement thereof.

The disks 7 are so arranged on the shaft 3 that the points and curved sockets of their peripheries are in staggered relation, so that when one of the cranks has its anti-friction roller in a socket of one of the disks, the outer end of that crank will be in its lower position and the roller on the opposite crank will engage the point of the opposite disk and hold the outer end of said second crank elevated; it being apparent that when the disks are revolved the cranks will rock oppositely and thereby rock the bracket 26, the shaft 21 and the rocker bar 22, to reciprocate the sickle bar.

Revolubly mounted on shaft 3 are arms 32 which extend forwardly beyond the sickle and have end hubs 33 within which a shaft 34 is revolubly mounted. Fixed to shaft 34 are reels or fans 35, and also fixed to said shaft is a sprocket wheel 36, the latter carrying a chain 37 which runs over a sprocket 38 fixed on shaft 3. On each of arms 32 is a depending ear 39 having a slot 40, through which a bolt 41 on the adjacent knife carrying bar 10 is projected, and whereby the elevation of the fan carrying arms may be varied to vary the elevation of the fan above the sickle.

Fixed to the rear of the knife frame 12 are brackets 42 having end bosses 43 provided with slots 44.

45 designates a shaft extending between the brackets 42 and having reduced threaded ends 46 projected through the slots 44, so that the shoulders 47 on the shaft body may bear against the inner faces of the brackets. The ends of the reduced members are threaded to carry nuts 48 which may be tightened against the outer faces of the brackets to hold the shaft in an adjusted position. Revolubly mounted on said shaft is a roller 49 which is adapted to travel on the ground and support the knife and the parts carried by the bars 10 and 32.

Integral with the bars 10 are rearwardly projecting arms 50 which are inclined upwardly, back of the main shaft, and have inturned lugs 51. Pivotally connected with the bars 50, in advance of the lugs, are straps 52 to which the handle 53 of the machine is attached.

In using the machine, presuming the parts to be assembled as described, when the mower is pushed forwardly the shaft 3 locks to the wheels 1 and 2 through the pawl and ratchet mechanism and is revolved with the wheels, thereby revolving the serrated disks 7 which are fixed thereon. When the disks revolve, the cranks 28 are rocked oppositely through the engagement of the anti-friction rollers with the staggered peripheries of the disks, so that the bar 26 is rocked to actuate the sickle and thereby mow grass as the machine travels forwardly. Simultaneously with the reciprocation of the sickle, the fans 35 are revolved through the chain belt connection with the shaft 3, so that the tops of the blades are moved into position for engagement by the sickle knives and the severed blades are blown back after the cutting has taken place.

It is apparent that when the machine is moved backwardly, the parts will slide over the ratchets and the sickle will be inoperative.

The adjustments of the fan and roller may be easily and quickly made by loosening and tightening the carrying bolts.

Having thus described my invention, what I claim as new therein and desire to secure by Letters-Patent is:—

1. A lawn-mower comprising ground wheels, a shaft operatively mounted in the ground wheels, disks fixed to the shaft and having serrated peripheries, the serrations in the separate disks being in staggered relation, a reciprocatory sickle mounted transversely of the ground wheels, a pivoted rocking bracket, means operatively connecting the rocking bracket with the sickle, and pivoted cranks respectively actuated by said disks and respectively engaging opposite ends of the rocking bracket.

2. A lawn-mower comprising ground wheels, a shaft revolubly mounted in the ground wheels, spaced disks fixed on the shaft, an arm mounted on the shaft and projecting forwardly therefrom, a second shaft journaled in said arm and extending perpendicularly thereto, a reciprocatory sickle having a socketed fixture, a rocker bar fixed on the second shaft and having a bearing in the fixture, a bracket fixed on said second shaft and projecting laterally therefrom, and pivoted cranks having their ends engaging the disks and opposite ends of the bracket respectively.

3. A lawn-mower comprising ground wheels, a shaft revolubly mounted in the ground wheels, spaced disks fixed on the shaft, an arm mounted on the shaft and projecting forwardly therefrom, a second shaft journaled in said arm and extending perpendicularly thereto, a reciprocatory sickle having a socketed fixture, a rocker bar fixed on the second shaft and having a bearing in the fixture, a bracket fixed on said second shaft and projecting laterally therefrom, and cranks pivotally mounted on opposite sides of the second shaft and having their ends engaging the disks and bracket respectively, and having contact members in the ends of said cranks for adjusting the cranks relative to the bracket.

4. A lawn-mower comprising running gear, bars mounted on the running gear, a cutting mechanism carried by said bars, arms adjustably mounted on the running gear, a fan carried by said arms, said bars having slotted portions, and bolts carried by said bars and projected through the slotted portions of the arms, for the purpose set forth.

5. A lawn mower having ground wheels, a shaft revolubly mounted in the ground wheels, a reciprocatory sickle, means including a rocking member for actuating the sickle, pivoted members having adjustable means for alternately engaging the rocking member to oscillate the rocking member, and means actuated by said shaft for actuating said pivoted members.

6. A lawn mower having ground wheels, a shaft revolubly mounted in the ground wheels, a reciprocatory sickle, a rock shaft, means actuated by the rock shaft for operating the sickle, a rocking member secured to the rock shaft, pivoted members having adjustable screws for alternately engaging the rocking member to oscillate the rocking member, and means actuated by the first shaft for actuating the pivoted members.

7. A lawn mower having ground wheels, a shaft revolubly mounted in the ground wheels, a reciprocatory sickle, means including a rocking member for operating the sickle, pivoted members having adjustable means for alternately engaging the rocking member to oscillate the rocking member, and disks actuated by the shaft for engaging and alternately swinging said pivoted members.

8. A lawn mower having ground wheels, a shaft revolubly mounted in the ground wheels, a reciprocatory sickle, a rock shaft, means actuated by the rock shaft for operating the sickle, a rocking member secured to the rock shaft, pivoted members having adjustable means for alternately engaging the rocking member to oscillate the rocking member, and disks actuated by the first shaft and having means for respectively engaging and operating the said pivoted members alternately.

In testimony whereof I have signed my name to this specification in presence of two subscribing witnesses.

CHARLES W. FELKER.

Witnesses:
  E. B. HOUSE,
  FLORENCE M. VENDIG.

---

Copies of this patent may be obtained for five cents each, by addressing the "Commissioner of Patents, Washington, D. C."